(12) United States Patent
Norman

(10) Patent No.: US 6,814,405 B2
(45) Date of Patent: Nov. 9, 2004

(54) CAR SEAT SUPPORT MEMBER

(75) Inventor: Lisa C. Norman, Solana Beach, CA (US)

(73) Assignee: Infantino, LLC, San Diego, CA (US)

( * ) Notice: Subject to any disclaimer, the term of this patent is extended or adjusted under 35 U.S.C. 154(b) by 33 days.

(21) Appl. No.: 10/426,492

(22) Filed: Apr. 30, 2003

(65) Prior Publication Data

US 2003/0193223 A1 Oct. 16, 2003

Related U.S. Application Data

(62) Division of application No. 09/732,111, filed on Dec. 7, 2000, now abandoned.

(51) Int. Cl.⁷ .............................................. A47D 15/00
(52) U.S. Cl. ..................................... 297/219.12; 5/655
(58) Field of Search ...................... 297/219.1, 219.12, 297/397, 464; 5/655, 657, 636, 637, 640

(56) References Cited

U.S. PATENT DOCUMENTS

| 4,383,713 A | * | 5/1983 | Roston .................. 297/219.12 |
| 5,310,245 A | * | 5/1994 | Lyszczasz .............. 297/219.12 |
| 5,383,711 A | * | 1/1995 | Houghteling .......... 297/219.12 |
| 5,735,576 A | * | 4/1998 | Pepys et al. ........... 297/219.12 |
| 5,826,287 A |   | 10/1998 | Tandrup |
| 5,829,829 A |   | 11/1998 | Celestina-Krevh |
| 5,842,739 A |   | 12/1998 | Noble |
| 5,916,089 A | * | 6/1999 | Ive ........................ 297/219.12 |
| 6,139,100 A |   | 10/2000 | Baskin-Lockman et al. |

OTHER PUBLICATIONS

OshKosh Baby Hugs Head Support from Babycenter.com Website.
OshKosh seat cover from Toys R Us website.
Aloha Tyes head support from Aloha Tyes website.
Aloha Tyes Snuggle Head Support from Aloha Tyes website.
Double Head Support by Nojo from Express Baby.com website.
Sherpa Infant Head Support by Nojo from Toys R Us website.
Especially for Baby Double Headrest for Newborns & Infants from Toys R Us website.

* cited by examiner

Primary Examiner—Peter R. Brown
(74) Attorney, Agent, or Firm—Stetina Brunda Garred & Brucker

(57) ABSTRACT

A car seat support comprising an elongate body portion and a head portion which extends from one end of the body portion. Extending from respective opposed sides of the head portion is an identically configured pair of elongate ear portions. The ear portions may be rolled or folded as necessary to be firmly captured between the head of an infant and the side walls of the receptacle of an infant car seat.

9 Claims, 4 Drawing Sheets

CAR SEAT SUPPORT MEMBER

RELATED APPLICATION

The present application is a divisional of U.S. application Ser. No. 09/732,111 entitled CAR SEAT SUPPORT filed Dec. 7, 2000 now abandoned.

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to car seat accessories, and more particularly to a support member configured for retrofit placement into an infant car seat and specifically adapted to provide firm, adjustable support to the head of the infant alone or in combination with the infant's body.

There is currently known in the prior art a wide variety of infant carrying car seats which are adapted to maintain an infant in a secure, rearwardly facing orientation upon a vehicle seat. The common structural attributes of these prior art car seats include a receptacle which is typically fabricated from a hard plastic material and specifically shaped to accommodate the infant wherein the infant is generally maintained in a reclined, sitting position. Protruding from the receptacle in spaced relation to each other is a pair of shoulder straps, the distal ends of which are attached to a common support member. The support member typically has a generally T-shaped configuration, with the distal ends of the shoulder straps being attached to the horizontal segment of the support member. The distal end of the vertical segment of the support member typically has a buckle protruding therefrom which is receivable into a complementary lock mechanism disposed within the receptacle. Upon the placement of the infant into the receptacle, the shoulder straps are advanced over the infant's head so as to extend about the infant's shoulders such that the support member generally rests upon the infant's chest. The buckle of the support member is then advanced into the locking mechanism, thus securing the infant within the receptacle. The prior art car seats include a tightening mechanism which allows the shoulder straps to be firmly engaged to the infant's shoulders upon the receipt of the buckle into the locking mechanism.

The receptacles of prior art infant car seats are typically sized to accommodate an infant of one year of age or older. Thus, the receptacles typically substantially exceed the size of very young infants (e.g., newborns). As such, upon the placement of very young infants into car seats, there is a tendency for the infant, and particularly its head, to move or shift within the receptacle despite the restraints imposed by the shoulder straps and support member. To alleviate this problem, there has been developed in the prior art car seat accessories which are adapted to provide a greater level of support to a very small infant within the receptacle of the car seat.

Perhaps the most popular of the currently known car seat accessories is a liner which is adapted for placement into the receptacle of the car seat. The prior art liner includes a main body defining various slots adapted to accommodate the shoulder straps and buckle of the support member. Formed on one end of the main body is a padded, arcuate wall which, when the infant is rested upon the main body, is adapted to extend about the infant's head. The padded wall is intended to fill at least a portion of the gap or void which would otherwise be defined between the infant's head and the side walls of the receptacle of the car seat.

Though the prior art liners are generally operative to provide a more "snug" fit between the infant and the receptacle of the car seat, they possess certain deficiencies which detract from their overall utility. The deficiencies are most apparent in the case of very young infants and newborns wherein the size of the wall of the liner is typically insufficient to firmly support the infant's head. More particularly, though the wall of the prior art liner fills some of the gap or void between the infant's head and the side walls of the receptacle, there is still typically a gap or space between the head of the newborn or very young infant and the wall itself. This gap typically results in the infant's head moving from side-to-side or being cocked over to one particular side within the liner. To alleviate this condition, a common practice for parents is to roll up one or more diapers or towels and wedge them between the sides of the infant's head and the wall of the liner so as to provide firm support to the infant's head.

The present invention overcomes this deficiency by providing a car seat support which is adapted for retrofit placement into the receptacle of the car seat and includes a pair of adjustable ear portions which are adapted to completely fill the gap or void otherwise defined between the infant's head and the side walls of the receptacle, thus providing firm support to the infant's head within the car seat. The adjustability of the ear portions of the present car seat support is adapted to accommodate the growth of the infant. Thus, as the infant matures, the effective width or thickness of each of the ear portions can be adjusted as needed to maintain firm support to the infant's head. The present invention also provides a supplemental support which may be used in conjunction with the car seat support and provides similar, adjustable support to the torso and arms of the infant within the receptacle of the car seat. These, as well as other features and advantages of the present invention, will be describe in more detail below.

BRIEF SUMMARY OF THE INVENTION

In accordance with a first embodiment of the present invention, there is provided a car seat support comprising an elongate body portion which defines opposed ends. Extending from one end of the body portion is an integral head portion which itself defines opposed sides. A pair of slots are defined between the body and head portions, with the slots being sized and configured to accommodate respective ones of a pair of shoulder straps of a conventional infant car seat. Additionally, formed within that end of the body portion opposite the end having the head portion extending therefrom is a notch which is adapted to provide access to a buckle receiving locking mechanism of the car seat. In this regard, the car seat support of the present invention is specifically adapted for retrofit placement into the receptacle of a conventional infant car seat, with the body portion being sized such that the slots and notch are in proper alignment or registry with the shoulder straps and locking mechanism of the car seat when the car seat support is properly positioned or oriented within the receptacle thereof.

In addition to the body and head portions, the car seat support of the first embodiment includes an identically configured pair of elongate ear portions which are integral with and extend laterally from respective ones of the opposed sides of the head portion. The ear portions are sized and configured to be rolled or folded as needed to be firmly captured between the sides of the infant's head and the side walls of the receptacle of the car seat, thus providing firm support to the infant's head. Whether the ear portions are tightly or loosely rolled or folded is dependent upon the size of the gap or space defined between the infant's head and the side walls of the receptacle of the car seat. In this respect, for very small infants or newborns, the ear portions will typically be loosely rolled to effectively increase the width or thickness thereof, thus allowing the same to adequately fill the gap between the infant's head and the side walls of the receptacle so as to provide firm support to the infant's head. As the infant matures and grows, thus resulting in a reduced gap or space between the infant's head and the side walls of the receptacle, the ear portions may be tightly rolled so as to reduce the effective width or thickness thereof. As the growth of the infant's body (and in particular its head) continues, the ear portions may be folded as opposed to rolled thereby further reducing the effective width or thickness thereof.

In accordance with a second embodiment of the present invention, there is provided a car seat support similar in structure to the first embodiment, except that the ear portions are each provided in a reduced length, pillow-like configuration as opposed to having an elongate, strap-like configuration as in the first embodiment. Each of the ear portions of the car seat support of the second embodiment may be selectively folded inwardly into varying levels or degrees of overlapping relation to the head portion of the car seat support as needed to provide firm support to the sides of the infant's head.

In accordance with a third embodiment of the present invention, there is provided a car seat support which is substantially similar to the car seat support of the second embodiment, but further includes a shroud portion which extends along the head and ear portions. The shroud portion is selectively movable between folded and unfolded or deployed orientations. When in the folded orientation, the shroud portion does not protrude outwardly beyond the ear portions, and thus does not protrude beyond the infant's head resting upon the head portion. When in the unfolded or deployed orientation, the shroud portion protrudes well beyond the ear portions and thus the infant's head, thus acting as a visor to prevent excessive exposure of the infant's eyes to, for example, sunlight.

Still further in accordance with the present invention, there is provided a supplemental support which may be used in conjunction with the car seat support of either the first, second, or third embodiments of the present invention. The supplemental support comprises a rectangularly configured supplemental body portion and a pair of side rail portions which extend along respective ones of the opposed lateral sides of the supplemental body portion. The side rail portions are each formed to include a slight arcuate contour, and are each further selectively movable into varying levels or degrees of overlapping relation to the supplemental body portion. The side rail portions are adapted to provide firm support to the torso and arms of the infant when the supplemental body portion is placed into direct contact or engagement with the body portion of the car seat support.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
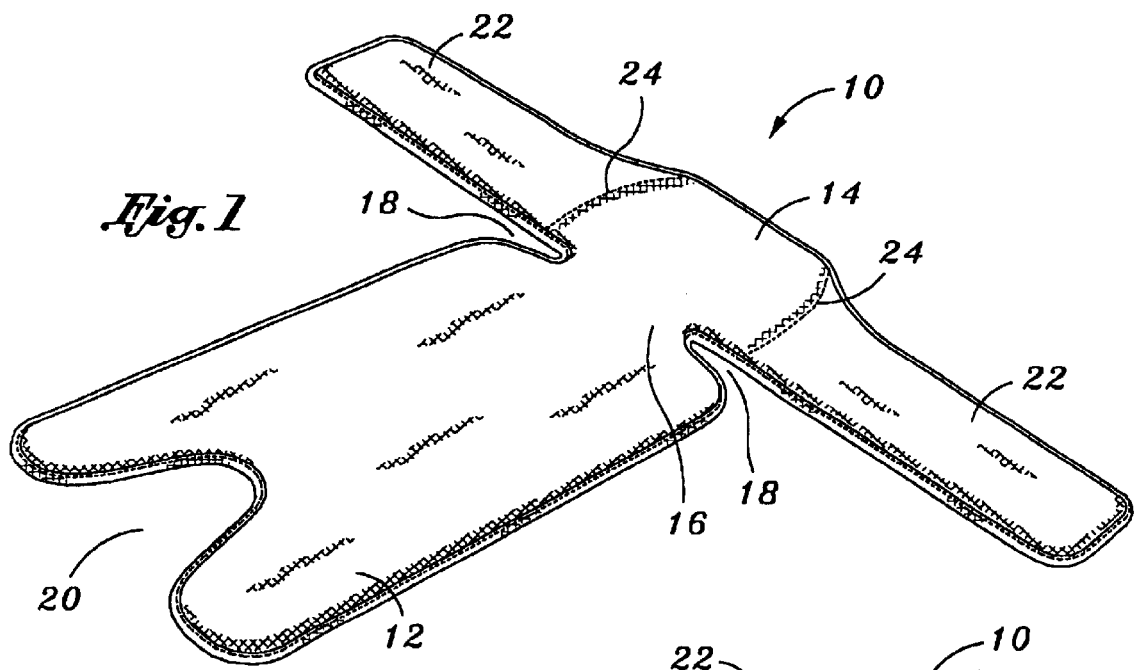
FIG. 1 is a perspective view of a car seat support constructed in accordance with a first embodiment of the present invention.

Referring now to the drawings wherein the showings are for purposes of illustrating preferred embodiments of the present invention only, and not for purposes of limiting the same, FIG. 1 perspectively illustrates a car seat support 10 constructed in accordance with a first embodiment of the present invention. The car seat support 10 comprises an elongate, generally rectangularly body portion 12 which defines opposed pairs of lateral and longitudinal sides. In addition to the body portion 12, the car seat support 10 includes a head portion 14 which is integral with and extends from one of the lateral sides of the body portion 12. In this respect, the junction between the body and head portions 12, 14 is defined by a reduced width neck 16. Additionally, defined between the body and head portions 12, 14 is a spaced pair of elongate slots 18. The inner ends of the slots 18 terminate at respective ones of the opposed ends of the neck 16. The slots are sized and configured to accommodate respective ones of a pair of shoulder straps of a conventional infant car seat. Additionally, formed within the lateral side of the body portion opposite that having the head portion 14 extending therefrom is a notch 20 which is adapted to provide access to a buckle receiving locking mechanism of the car seat.

As indicated above, the car seat support 10 of the present invention is specifically adapted for retrofit placement into the receptacle of a conventional infant car seat. As such, the body and head portions 12, 14 are preferably sized such that the slots 18 and notch 20 are in proper alignment or registry with the shoulder straps and locking mechanism, respectively, of the car seat when the car seat support 10 is properly positioned or oriented within the receptacle thereof.

Figure 2:
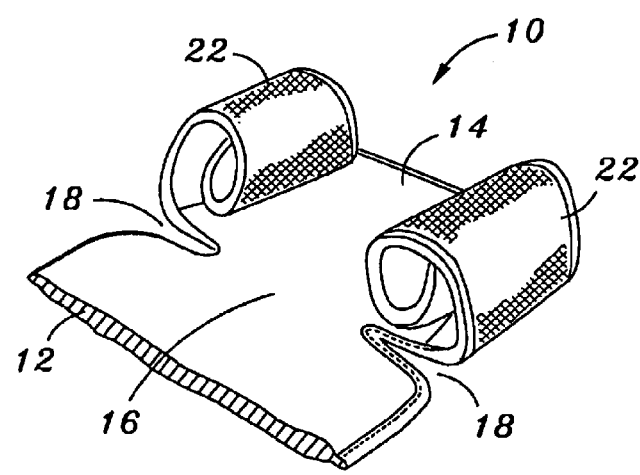
FIG. 2 is a perspective view of the car seat support of the first embodiment illustrating the ear portions thereof in a rolled configuration.
Figure 3:
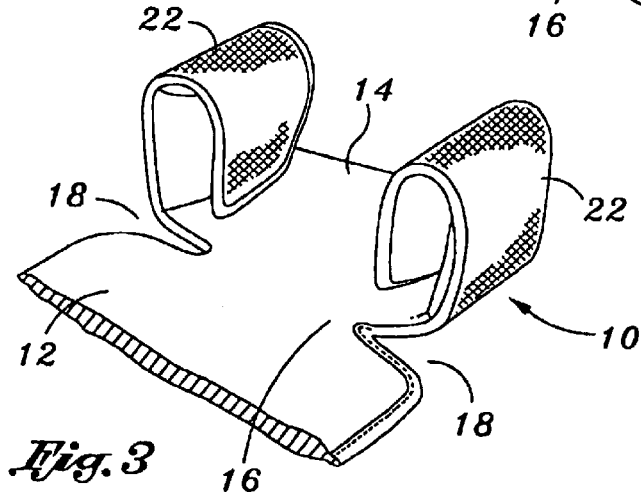
FIG. 3 is a perspective view of the car seat support of the first embodiment illustrating the ear portions thereof in a folded configuration.

The car seat support 10 of the first embodiment further comprises an identically configured pair of elongate, generally rectangular ear portions 22 which are integral with and extend laterally from respective ones of the opposed sides of the head portion 14. The junction between each ear portion 22 and the head portion 14 is defined by a seam 24. The ear portions 22 are each sized and configured to be rolled (as shown in FIG. 2) or folded (as shown in FIG. 3) as needed to be firmly captured between the sides of the infant's head and the side walls of the receptacle of the car seat, thus providing firm support to the infant's head. As indicated above, whether the ear portions 22 are tightly or loosely rolled or folded is dependant upon the size of the gap or space defined between the infant's head and the side walls of the receptacle of the car seat. For very small infants or newborns, the ear portions 22 will typically be loosely rolled to effectively increase the width or thickness thereof, thus allowing the same to adequately fill the gap between the infant's head and the side walls of the receptacle so as to provide firm support to the infant's head. As the infant matures and grows, thus resulting in a reduction in the size of the gap or space between the infant's head and the side walls of the receptacle, the ear portions 22 may be tightly rolled so as to reduce the effective width or thickness thereof. As the growth of the infant's body continues, the ear portions 22 may be folded as opposed to rolled thereby further reducing the effective width or thickness thereof. As will be recognized, it is intended that the thickness or width of the ear portions 22 will be adjusted through the rolling or folding process as is necessary to cause the same to be firmly captured between the head of the infant and the side walls of the receptacle of the car seat.

The car seat support 10 of the first embodiment is preferably fabricated from two or more layers of soft fabric material which are attached to each other by, for example, stitching. Those of ordinary skill in the art will recognize that a layer of padding may be included between the fabric layers, and that the car seat support 10 may alternatively be fabricated from a single layer of material.

Figure 4:
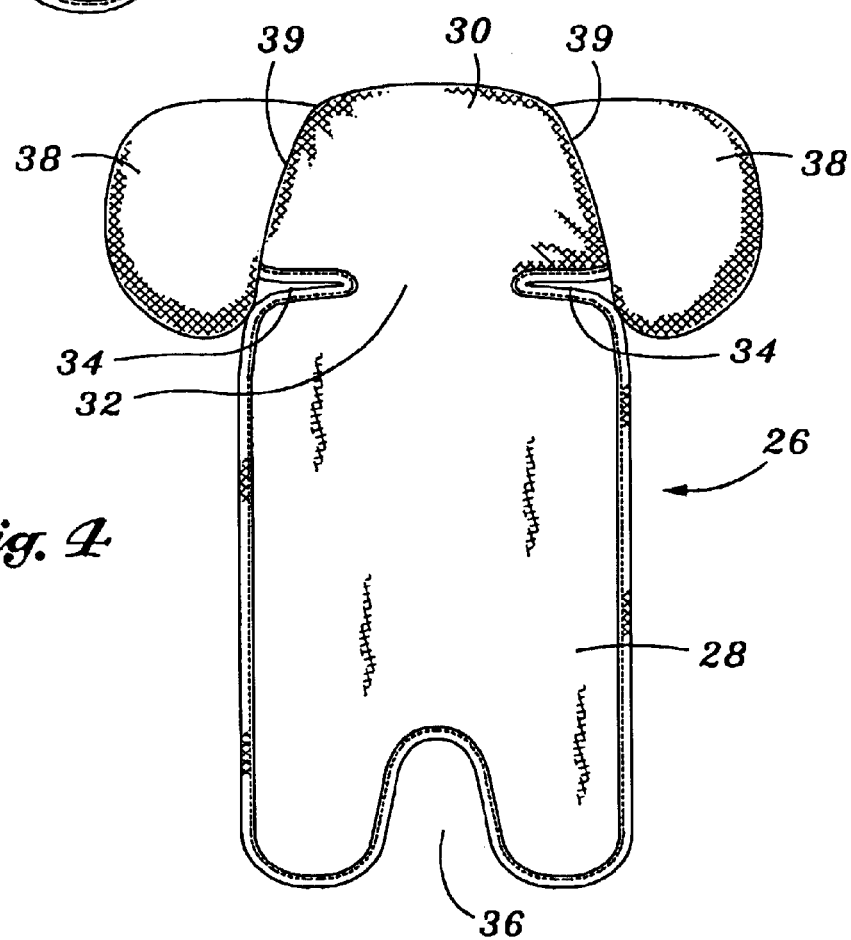
FIG. 4 is a perspective view of a car seat support constructed in accordance with a second embodiment of the present invention.

Referring now to FIG. 4, there is shown a car seat support 26 constructed in accordance with a second embodiment of the present invention. The car seat support 26 is structurally similar to the car seat support 10 of the first embodiment, and comprises a generally rectangular body portion 28 which defines opposed pairs of longitudinal and lateral sides. Integral with and extending from one of the lateral sides of the body portion 28 is a head portion 30. The junction between the body portion 28 and the head portion 30 is defined by a neck 32. Additionally, similar to the car seat support 10, a pair of slots 34 for accommodating the shoulder straps of the car seat are defined between the body and head portions 28, 30, with a notch 36 being formed in the opposite lateral side of the body portion 28 for providing access to the buckle receiving locking mechanism of the car seat.

Figure 5:
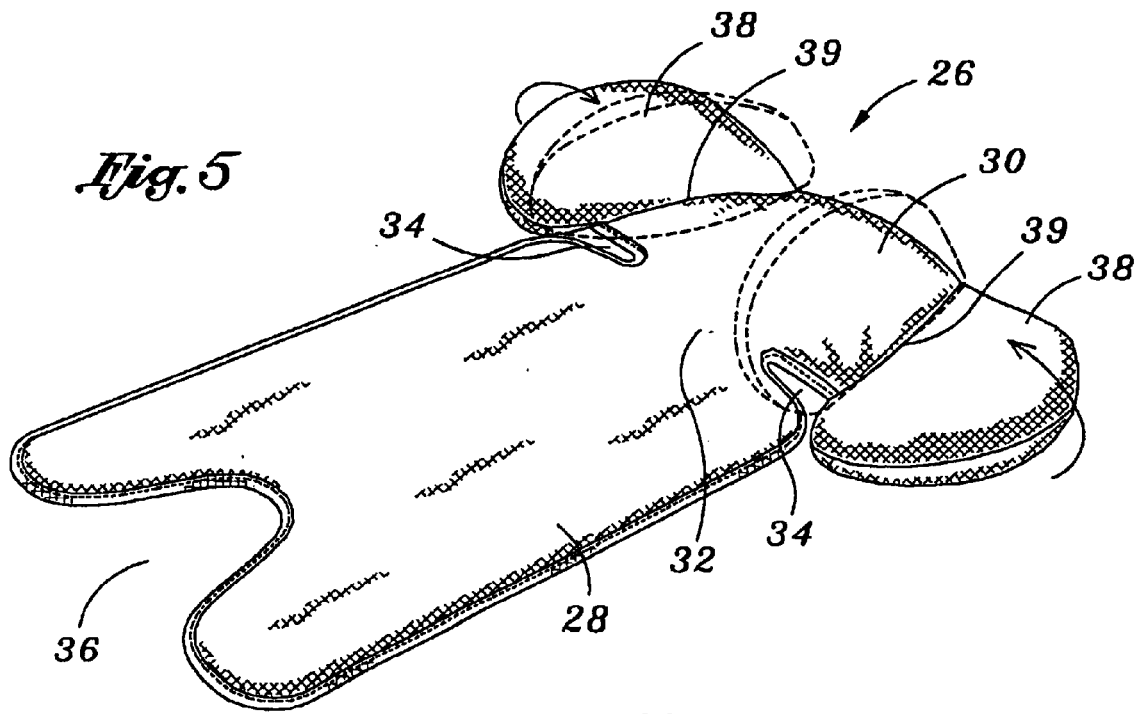
FIG. 5 is a perspective view of the car seat support of the second embodiment illustrating the ear portions thereof in an inwardly rolled or turned configuration.

The car seat support 26 of the second embodiment further comprises an identically configured pair of ear portions 38 which are integral with and extend from respective ones of the opposed sides of the head portion 30. The junction between each ear portion 38 and the head portion 30 is defined by a seam 39. Each of the ear portions 38 has a reduced length, pillow-like configuration as opposed to the elongate, strap-like configuration of each of the ear portions 22 of the car seat support 10 of the first embodiment. Each of the ear portions 38 of the car seat support 26 may be selectively folded or rolled inwardly into varying levels or degrees of overlapping relation to the head portion 30 in the manner shown in FIG. 5. The degree to which the ear portions 38 are inwardly turned to provide firm support to the sides of the infant's head is dependent upon the size of the infant's head and corresponding gap or space defined between the infant's head and the side walls of the receptacle of the car seat.

Figure 6:
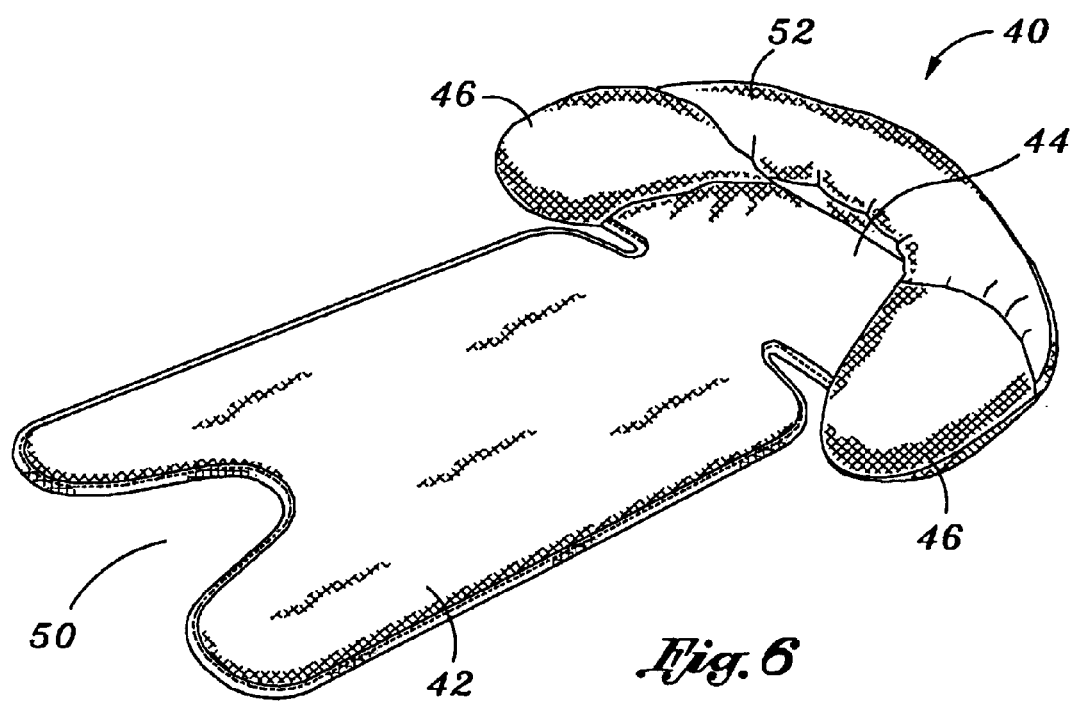
FIG. 6 is a perspective view of a car seat support constructed in accordance with a third embodiment of the present invention, illustrating a shroud portion thereof in a folded configuration.
Figure 7:
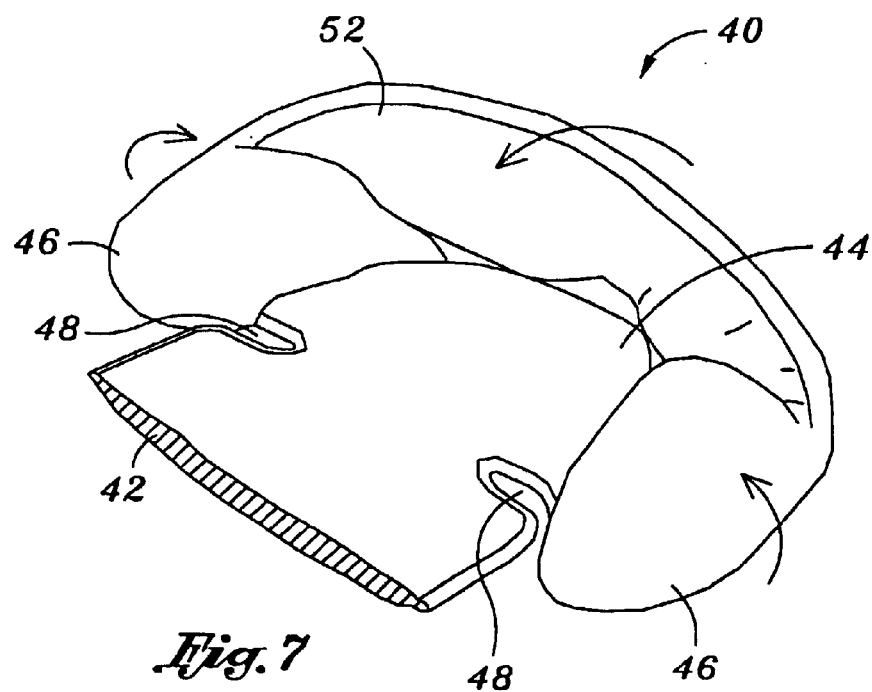
FIG. 7 is a perspective view of the car seat support of the third embodiment, illustrating the shroud portion thereof in an unfolded, deployed configuration.

Referring now to FIGS. 6 and 7, there is depicted a car seat support 40 constructed in accordance with a third embodiment of the present invention. The car seat support 40 is substantially similar in structure and function to the car seat support 26 of the second embodiment. In this respect, the car seat support 40 includes a body portion 42 which is identical to the body portion 28, a head portion 44 which is identical to the head portion 30, and a pair of ear portions 46 which are identical to the ear portions 38. Defined between the body and head portions 42, 44 are slots 48 which are identical to the slots 34, while disposed within one lateral side of the body portion 42 is a notch 50 which is identical to the notch 36.

The sole distinction between the car seat support 40 and the car seat support 26 is that the car seat support 40 further includes a shroud portion 52 which is integral with and extends along the head and ear portions 44, 46. The shroud portion 52 is selectively movable between a folded position (shown in FIG. 6) and an unfolded or deployed position (shown in FIG. 7). As seen in FIG. 6, when the shroud portion 52 is disposed in its folded position, it does not protrude outwardly beyond the ear portions 46. When in the unfolded or deployed position, the shroud portion 52 protrudes beyond the ear portions 46 and thus the infant's head, thus acting as a visor to prevent excessive exposure of the infant's eyes to, for example, sunlight. The car seat supports 26, 40 of both the second and third embodiments are preferably fabricated from one or more fabric layers with or without an intermediate padding layer in the same manner previously described in relation to the car seat support 10 of the first embodiment. It will be recognized that in the car seat supports 26, 40 of the second and third embodiments, padding will be included within the ear portions 38, 46 to provide the same with a padded, pillow-like configuration.

Figure 8:
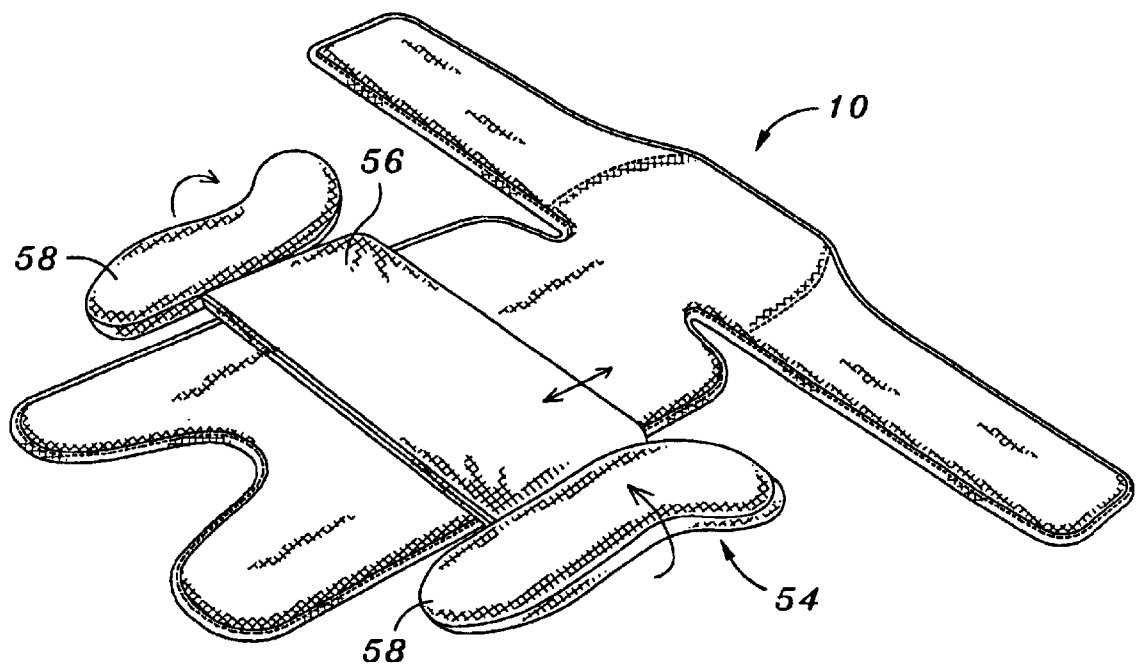
FIG. 8 is a perspective view of a supplemental support which may be used in conjunction with the car seat support of either the first, second or third embodiments of the present invention.
Figure 9:
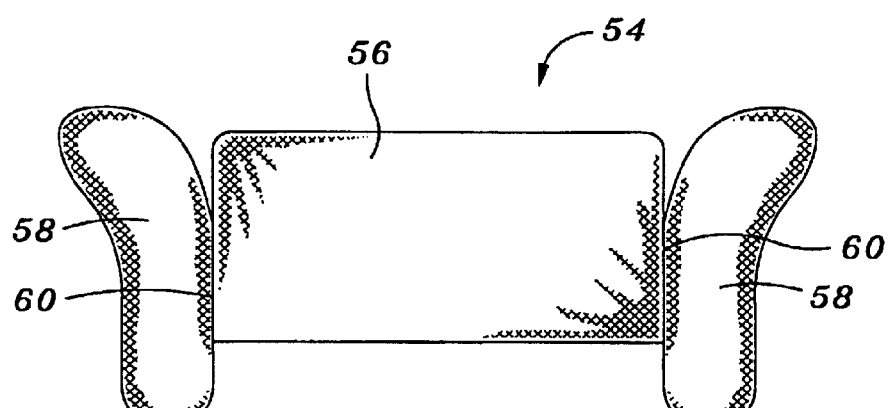
FIG. 9 is a top plan view of the supplemental support shown in FIG. 8.

Referring now to FIGS. 8 and 9, there is shown a supplemental support 54 which may be used in conjunction with the car seat supports 10, 26, 40 of either the first, second, or third embodiments of the present invention. The supplemental support 54 comprises a rectangularly configured supplemental body portion 56 which defines opposed pairs of longitudinal and lateral sides. In addition to the supplemental body portion 56, the supplemental support 54 includes an identically configured pair of side rail portions 58 which are integral with and extend along respective ones of the lateral sides of the supplemental body portion 56. The junction between each of the side rail portions 58 and the supplemental body portion 56 is defined by a seam 60. As seen in FIGS. 8 and 9, each of the side rail portions 58 has a padded, pillow-like configuration, and is formed to include a slight arcuate contour. The side rail portions 58 are each further selectively movable into varying levels or degrees of overlapping relation to the supplemental body portion 56. In this respect, the side rail portions 58 are adapted to provide firm support to the torso and arms of the infant when the supplemental body portion 56 is placed into direct contact with the body portion 12, 28, 42 of the car seat support 10, 26, 40 in the exemplary manner shown in FIG. 8 in relation to the car seat support 10 of the first embodiment. The degree to which the side rail portions 58 are turned or rolled inwardly is dependent upon the size of the infant's torso and corresponding gap defined between the torso and the side walls of the receptacle of the car seat. As with the ear portions 38, 46 of the car seat supports 26, 40, the side rail portions 58 will be manipulated so as to be firmly captured between the head of the infant and the side walls of the receptacle of the infant car seat, thus providing firm support to the infant's head.

In addition to providing firm support to the torso of the infant, the side rail portions 58 of the supplemental support 54 are adapted to provide support to the infant's arms. The arcuate contour of each of the side rail portions 58 allows the same to fill the void or space normally defined between the infant's arms and the lowermost or deepest point within the receptacle of the car seat. The supplemental support 54 is preferably fabricated from multiple layers of soft fabric material which are attached to each other by, for example, stitching. As indicated above, the side rail portions 58 of the supplemental support 54 include padding between the fabric layers so as to provide the same with the thickened, pillow-like configuration.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A car seat support, comprising:
   a body portion defining opposed ends;
   a head portion extending from one of the ends of the body portion, the head portion defining opposed sides; and
   a pair of elongate ear portions extending from respective ones of the opposed sides of the head portion, each one of the ear portions having a generally rectangular configuration, a junction between the head portion and each one of the ear portions being defined by respective ones of a pair of generally arch-shaped seams, each one of the ear portions being configured to be selectively foldable inwardly from a generally flat position to a generally upright position; wherein each of the portions is generally aligned with the head portion in the flat position, each of the ear portions being free-standing when folded inwardly into the upright position.

2. The car seat support of claim 1 wherein the head portion is integral to the body portion.

3. The car seat support of claim 1 wherein the ear portions are integral to the head portion.

4. The car seat support of claim 1 wherein a pair of unobstructed V-shaped slots are defined between the body portion and the head portion.

5. The car seat support of claim 1 wherein the end of the body portion opposite the end having the head portion extending therefrom includes a notch formed therein.

6. The car seat support of claim 1 further in combination with:
   a supplemental support comprising:
      a supplemental body portion defining opposed sides; and
      a pair of side rail portions extending along respective ones of the opposed sides of the supplemental body portion;
   the supplemental body portion being placeable against the body portion of the car seat support.

7. The supplemental support of claim 6 wherein the side rail portions are integral to the supplemental body portion.

8. The supplemental support of claim 6 wherein each of the side rail portions is actually contoured.

9. A car seat support adapted for placement into a receptacle of an infant car seat and configured to provide adjustable support to a head of an infant resting therein, comprising:
   a body portion having a generally elongate rectangular shape defining opposed ends and opposed parallel lateral sides;
   a head portion integral with and extending from one of the ends of the body portion, the head portion having a generally trapezoidal shape defining opposed arcuately-shaped sides and a generally straight upper perimeter disposed opposite the end of the body portion from which the head portion extends, the end of the body portion opposite the end having the head portion extending therefrom including a generally V-shaped notch formed therein, a pair of generally V-shaped slots being formed at a junction of the head and body portion, each one of the slots being unobstructed and extending inwardly from a respective one of the lateral sides to define a neck; and
   a pair of substantially identically configured elongate ear portions extending from respective ones of the opposed sides of the head portion, each one of the ear portions having a generally rectangular perimeter and being joined to the head portion at respective ones of a pair of generally arch-shaped seams, each one of the ear portions being configured to be selectively foldable inwardly from a generally flat position to a generally upright position;
   wherein each of the ear portions is generally aligned with the head portion in the flat position, each of the ear portions being free-standing when folded inwardly into the upright position, the body, head and ear portions being fabricated as a unitary structure of two layers of fabric material having a layer of padding captured therebetween, the layer of padding in the ear portions having thickness that is greater than the thickness in the head and body portions.

* * * * *